Patented Apr. 11, 1950

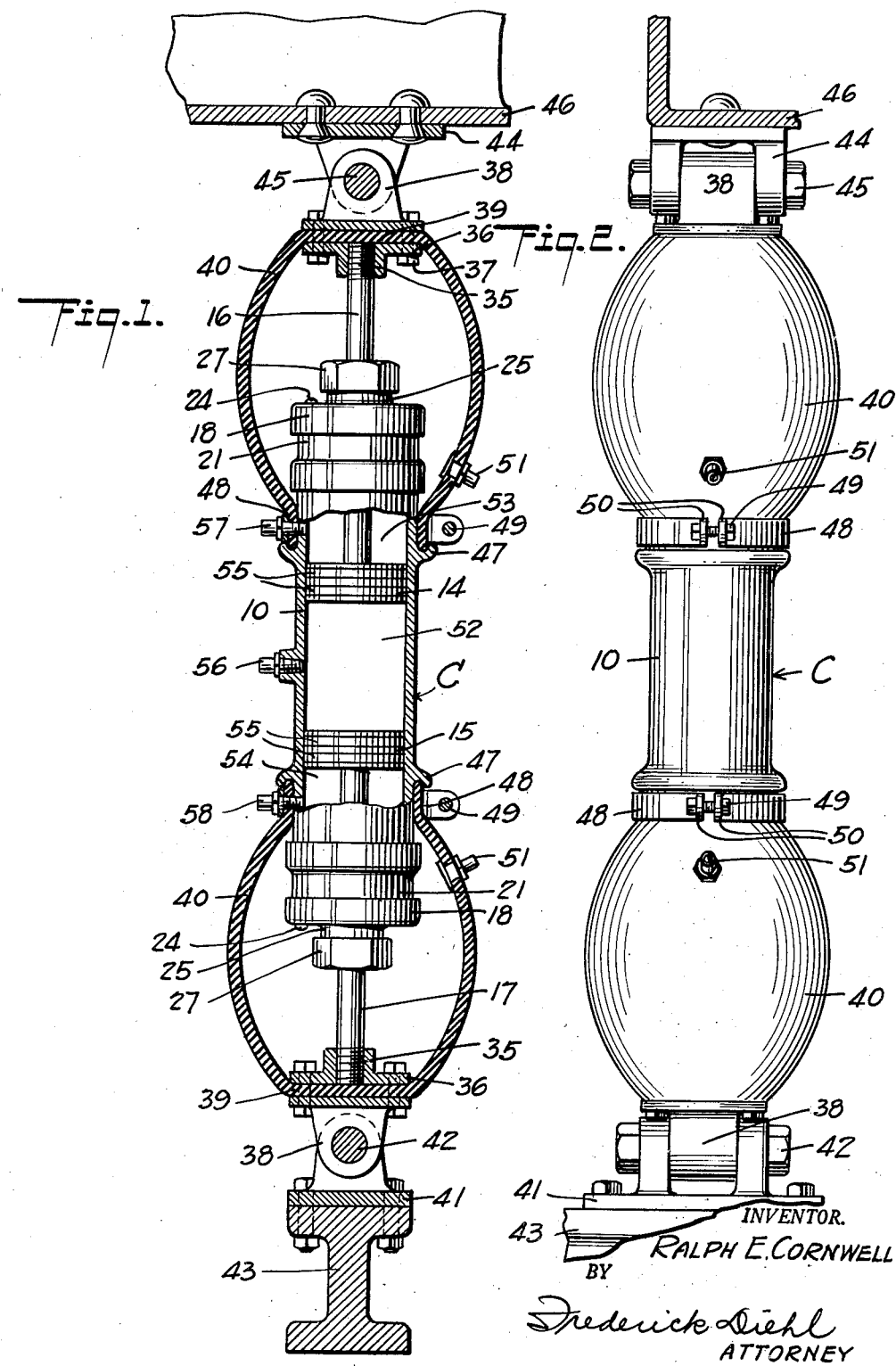

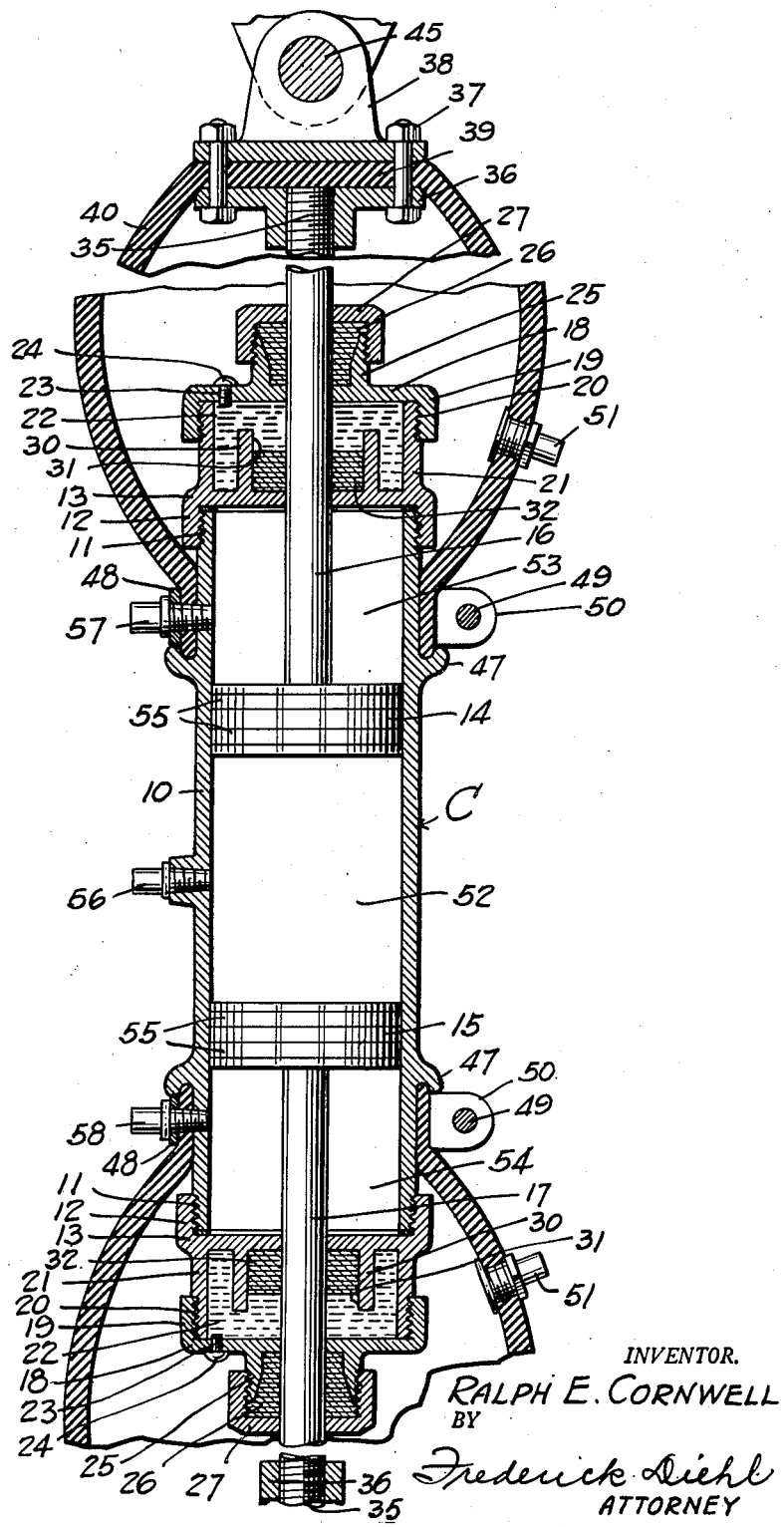

2,503,378

UNITED STATES PATENT OFFICE 2,503,378

PNEUMATIC SUSPENSION AND SHOCK ABSORBING MECHANISM FOR VEHICLES

Ralph E. Cornwell, La Canada, Calif.

Application February 21, 1944, Serial No. 523,288

4 Claims. (Cl. 267—65)

This invention relates generally to vehicles and more particularly to spring suspension and shock absorbing means therefor.

An object of this invention is to provide a mechanism structurally characterized by pneumatic means performing the dual functions of a spring suspension mechanism and shock absorber for the body of the vehicle, all in such manner as to combine in one compact unit, a simple, durable and positively acting mechanism which will pneumatically suspend the body of the vehicle on its axles, and will effectively cushion and dampen all road shocks so as to prevent them from being transmitted to the body, whereby to dispense with separate mechanical suspension springs and shock absorber units.

More specifically, it is another object of this invention to provide a mechanism of the above described character which includes a floating cylinder having pistons arranged therein to provide working chambers between the pistons and between the latter and ends or heads of the cylinder, with the pistons being operatively connected to the axle and body of the vehicle, respectively, and the working chambers being normally under a predetermined air pressure for co-action of the pistons and cylinder in pneumatically supporting the body and pneumatically absorbing all road shocks.

A further object of the invention is to provide a pneumatic piston and cylinder unit for the support of the vehicle body and absorption of road shocks, which includes a sealing means for preventing any loss of air from the cylinder which might otherwise occur around the rods of the pistons incident to the working of the latter in the cylinder.

With these and other objects in view, the invention resides in the combinations, arrangements and functional relationships of elements as set forth in the accompanying specification and particularly pointed out in the appended claims.

In the accompanying drawings,

Figure 1 is a view in side elevation, partly in section, of one form of pneumatic suspension and shock absorbing mechanism for vehicles embodying this invention;

Figure 2 is a view in side elevation of said mechanism, ninety degrees removed from Figure 1;

Figure 3 is an enlarged longitudinal sectional view of the mechanism shown in the preceding figures.

Referring specifically to the drawings, the invention in its illustrated embodiment comprises a cylinder C including a cylindrical open ended barrel 10 having its ends externally threaded at 11 to threadedly receive the annular flange 12 of heads 13 which close the ends of the barrel.

Working in the cylinder C are pistons 14 and 15 to which are rigidly connected, rods 16 and 17, respectively, projecting through the heads 13 and through caps 18 whose annular flanges 19 are threaded at 20 onto collars 21 on the heads, for co-action therewith in defining a reservoir 22. This reservoir is supplied with a lubricating and sealing liquid such as mineral oil through a filling opening 23 in each cap 18, sealed by a threaded plug 24.

Each cap 18 is provided with a gland 25 containing a suitable packing 26 surrounding the respective piston rod 16 or 17, and adapted to be placed under the desired pressure by a nut 27 threaded on the gland. The heads 13 are each provided within the respective reservoir 22 with an annular collar 30 concentrically related to the collar 21 and providing a well 31 receiving suitable packing 32 through which the respective piston rod 16 or 17 projects, all to insure lubrication of the rods and sealing of the cylinder ends while rendering the rods free for reciprocating movement.

The outer end of each of the piston rods 16 and 17 is threaded at 35 to receive a flange 36 co-acting with the bolts 37 and a connector 38 to clamp therebetween the closed end 39 of an elastic or flexible sealing envelope 40 constructed of fabric-reinforced rubber or other suitable material. The connector 38 at one end of the cylinder C is connected by a bracket 41 and pin 42 to an axle 43 of the vehicle adjacent a wheel thereof, whereas the identically constructed connector 38 at the other end of the cylinder is connected by a bracket 44 and pin 45 to the chassis frame 46 or other suitable portion of the vehicle body.

The other and open end of each envelope 40 receives the corresponding end portion of the cylinder C and seats against an annular shoulder 47 formed on the barrel 10, and is clamped fluid-tight to the barrel by an embracing split ring 48 and constricting screw 49 passing through ears 50 at the ends of the ring. The two envelopes 40 are adapted to protect the respective piston rods 16 and 17 against contamination by foreign substances, and are inflated with air to a predetermined pressure through suitable valves 51.

In assembling the parts of the invention, the pistons 14 and 15 are positioned in the cylinder C in the spaced relationship to each other and to the ends of the cylinder for co-action therewith in defining working chambers 52, 53 and 54, the chamber 52 being intermediate the pistons, and the chambers 53 and 54 being between the respective pistons and the corresponding ends of the cylinder.

The pistons 14 and 15 are provided with suitable packing 55, and are adapted to be temporarily held in fixed positions by a suitable fixture or tool (not shown) following which air under pressure is forced into the three chambers 52, 53 and 54 concurrently, through suitable valves 56, 57 and 58, respectively. Air is supplied to the chambers 52, 53 and 54 when the vehicle is at rest, with sufficient air being forced into the chamber 52 for the pressure in the latter to support the required load by functioning in the same manner as the air in a pneumatic tire.

The operation of the invention is as follows:

With the parts in the position shown in Figures 1 and 3, let it be assumed that the wheel of the vehicle at which the mechanism is located encounters a rise or bump in the road. Such an obstruction will force the piston 15 to move towards the piston 14 which will increase the pressure of the air in the chamber 52, and will decrease the pressure of air in the chamber 54. Should the upward shock of the impact be sufficiently strong, a slight upward movement of the piston 14 will result, with a corresponding increase of air pressure in the chamber 53. When the wheel has left the bump, the tendency of the unequal air pressures in the chambers 52 and 54 to equalize, will cause the respective pistons to return to their original positions existing with the vehicle at rest.

Should the wheel encounter a hole or depression, the piston 15 will be forced away from the piston 14, thus increasing the air pressure in the chamber 54 and decreasing the air pressure in the chamber 52. As these pressures tend to equalize, the pistons will return to their original positions after the wheel has passed the hole.

When the wheel strikes a depression in the road, the above described action takes place in the opposite direction in the cylinder C, as the pressure in the chamber 54 will be increased by the compressing movement of the piston 15, thus decreasing the pressure in the chamber 52 and rendering the piston 14 free to be moved by the pressure in the chamber 53 which is now relatively higher than the pressure in the chamber 52. Thus the downward vertical movement of the axle 43 will be greatly reduced at the chassis 46, and the impact of the road shock effectively cushioned.

From the foregoing description, it will be manifest that the operation of the invention depends solely on expansion and compression of air in the chambers 52, 53 and 54, and that the air in chambers 53 and 54 always has a tendency to equalize in pressure, whereas the air pressure in the chamber 52 will support the load by functioning in the same manner as a pneumatic tire. The pressure in the chamber 52 depends on the force imposed on the pistons 14 and 15, which force, it will be clear, is being applied when the vehicle is at rest, as under such circumstances the weight of the vehicle is being supported. The pressures in the chambers 52, 53 and 54 will be equal only when no force is being applied, (i. e., when the weight of the vehicle is removed from the mechanism) the pressure in the chamber 52 exceeding those pressures in the chambers 53 and 54 when the force is applied, and being added to if necessary, to support the load.

I claim:

1. In a vehicle, a pneumatic suspension and shock absorbing mechanism adapted to be interposed between the axle and body of the vehicle, comprising: two relatively movable elements; means co-acting with said elements to define an air chamber separating the elements, and other air chambers in which air will be compressed by movement of the elements away from each other; said chambers being non-communicating one to another; means adapted to operatively connect said elements to the axle and body of the vehicle, respectively; and means through which air under pressure can be supplied to said chambers to provide a load-supporting air cushion between the elements, and other air cushions with which the respective elements co-act to cushion rebound shocks to which the vehicle is subjected.

2. In a vehicle, a pneumatic suspension and shock absorbing mechanism comprising: a floating cylinder; two pistons working in the cylinder and spaced from each other and from the heads of the cylinder to provide an intermediate chamber and end chambers containing air under pressure; means adapted to operatively connect one element to the vehicle body; means adapted to operatively connect the other element to the axle of the vehicle for co-action of the elements with said intermediate chamber in pneumatically supporting the vehicle, and with said end chambers in pneumatically cushioning the body thereof against rebound movement; elastic envelopes sealing in said operative connecting means to protect the latter against foreign substances; and means through which air under a predetermined pressure can be supplied to said envelopes to oppose the pressures in said end chambers so as to preclude air leakage from the latter.

3. In a vehicle, a pneumatic suspension and shock absorbing mechanism comprising: a floating cylinder; pistons working in the cylinder and normally spaced from each other and from the heads of the cylinder to provide chambers therein containing air under a predetermined pressure; rods connected to the pistons and projecting from the respective heads of the cylinder for operative connection to the vehicle body and axle, respectively; elastic envelopes, one for each rod; and means securing said envelopes to the cylinder and to enclose said rods in fluid-tight chambers; and means through which air under pressure can be supplied to said envelopes to place them under a predetermined pressure.

4. In a vehicle, a pneumatic suspension and shock absorbing mechanism comprising: a floating cylinder composed of a barrel and heads closing the ends of the barrel; two pistons working in the barrel with pneumatic pressure chambers therein between the pistons and between said heads and the respective pistons; rods connected to the pistons and projecting through said heads; collars on the heads; caps on the collars co-acting therewith to define lubricant reservoirs through which the rods work; means adapted to connect the rods to the vehicle body and axle respectively; elastic envelopes, one for each rod and connected fluid-tight to the cylinder and to the last means; and means through which air can be supplied to said envelopes to place them under a predetermined pressure.

RALPH E. CORNWELL.

REFERENCES CITED

The following references are of record in the file of this patent:

UNITED STATES PATENTS

| Number | Name | Date |
|---|---|---|
| 313,180 | Colwell | Mar. 3, 1885 |
| 450,518 | Mayer | Apr. 14, 1891 |
| 988,417 | West | Apr. 4, 1911 |
| 993,394 | Munn | May 30, 1911 |
| 1,631,569 | Aldrin | June 7, 1927 |
| 1,780,659 | Wallace | Nov. 4, 1930 |
| 2,139,192 | Krekel | Dec. 6, 1938 |
| 2,212,922 | Mercier | Aug. 27, 1940 |

FOREIGN PATENTS

| Number | Country | Date |
|---|---|---|
| 5,969 | Great Britain | Sept. 20, 1906 |
| 511,468 | France | Sept. 24, 1920 |
| 812,993 | France | Feb. 15, 1937 |